United States Patent
Trentin et al.

(10) Patent No.: US 10,787,845 B2
(45) Date of Patent: Sep. 29, 2020

(54) DUAL PIVOT HINGE ASSEMBLIES

(71) Applicant: Ford Global Technologies LLC, Dearborn, MI (US)

(72) Inventors: Daniel Trentin, Ivanhoe (AU); Dave Spink, Jan Juc (AU)

(73) Assignee: Ford Global Technologies LLC, Dearborn, MI (US)

( * ) Notice: Subject to any disclaimer, the term of this patent is extended or adjusted under 35 U.S.C. 154(b) by 105 days.

(21) Appl. No.: 16/199,862

(22) Filed: Nov. 26, 2018

(65) Prior Publication Data

US 2020/0165850 A1 May 28, 2020

(51) Int. Cl.
| | | |
|---|---|---|
| *B60J 5/00* | (2006.01) |
| *E05D 3/14* | (2006.01) |
| *E05D 3/12* | (2006.01) |
| *B60J 5/04* | (2006.01) |
| *E05D 3/10* | (2006.01) |

(52) U.S. Cl.
CPC ............. *E05D 3/147* (2013.01); *E05D 3/122* (2013.01); *B60J 5/047* (2013.01); *E05D 3/10* (2013.01); *E05Y 2201/71* (2013.01); *E05Y 2900/531* (2013.01)

(58) Field of Classification Search
CPC ......... E05Y 2900/132; E05Y 2201/722; E05Y 2201/434; Y10T 16/541; E05D 3/122; B64C 25/62; E05F 15/614; G06F 1/1681
See application file for complete search history.

(56) References Cited

U.S. PATENT DOCUMENTS

| | | | | |
|---|---|---|---|---|
| 5,244,247 A | * | 9/1993 | Kuwabara | B60J 5/047 16/365 |
| 6,030,024 A | | 2/2000 | Schmidhuber et al. | |
| 6,658,803 B2 | * | 12/2003 | Szyjkowski | E04F 19/08 49/246 |
| 7,000,977 B2 | * | 2/2006 | Anders | E05D 15/48 296/146.12 |
| 7,178,853 B2 | | 2/2007 | Oxley et al. | |
| 7,596,831 B2 | * | 10/2009 | Faubert | E05D 3/18 16/287 |
| 7,832,056 B2 | * | 11/2010 | Kuwajima | H04M 1/022 16/282 |
| 7,931,327 B2 | | 4/2011 | Ertl | |
| 8,122,644 B2 | * | 2/2012 | Jarolim | B61D 19/008 49/209 |
| 8,205,305 B2 | * | 6/2012 | Wang | G06F 1/1681 16/354 |
| 8,234,816 B2 | * | 8/2012 | Heuel | E05D 3/127 49/211 |
| 8,434,197 B2 | * | 5/2013 | Oshima | E05D 7/0423 16/357 |

(Continued)

FOREIGN PATENT DOCUMENTS

| | | |
|---|---|---|
| DE | 4308675 C2 | 4/2002 |
| DE | 202017106617 U1 | 11/2017 |
| GB | 2410980 A | 8/2005 |

*Primary Examiner* — Kiran B Patel
(74) *Attorney, Agent, or Firm* — Alice Xu; Kolitch Romano LLP

(57) ABSTRACT

A hinge assembly comprises a link arm; a first pivot connected to a door leaf and the link arm; a second pivot parallel, distant to the first pivot, and connected to a body leaf and the link arm; a first gear attached to the first pivot; a second gear attached to the second pivot; and an idler gear engaging the first and second gears at a plane substantially perpendicular to the first pivot.

20 Claims, 11 Drawing Sheets

(56) References Cited

U.S. PATENT DOCUMENTS

| | | | | |
|---|---|---|---|---|
| 8,474,101 B2* | 7/2013 | Wang | G06F 1/1681 | 16/354 |
| 8,578,561 B2* | 11/2013 | Chuang | G06F 1/1681 | 16/354 |
| 8,707,521 B1* | 4/2014 | Mack | E05D 11/06 | 16/326 |
| 8,776,319 B1* | 7/2014 | Chang | G06F 1/1681 | 16/303 |
| 9,009,919 B1* | 4/2015 | Chiang | G06F 1/1681 | 16/303 |
| 9,068,383 B2* | 6/2015 | Wurst | E05D 7/00 | |
| 9,103,146 B2* | 8/2015 | Morinaga | E05D 5/062 | |
| 9,127,490 B2* | 9/2015 | Chen | E05D 3/122 | |
| 10,563,438 B1* | 2/2020 | Chen | E05D 5/10 | |
| 2003/0097731 A1* | 5/2003 | Nania | E05D 3/127 | 16/334 |
| 2005/0127712 A1* | 6/2005 | Castillo | E05D 3/127 | 296/146.12 |
| 2007/0245525 A1* | 10/2007 | Hoffman | E05D 15/00 | 16/367 |
| 2008/0083089 A1* | 4/2008 | Hoffman | E05D 3/10 | 16/367 |
| 2008/0083090 A1* | 4/2008 | Hoffman | E05D 3/06 | 16/367 |
| 2009/0070961 A1* | 3/2009 | Chung | E05D 3/122 | 16/354 |
| 2009/0106941 A1* | 4/2009 | Greenbank | B60J 5/0472 | 16/371 |
| 2010/0301631 A1* | 12/2010 | Scott | E05D 3/127 | 296/146.12 |
| 2011/0030171 A1* | 2/2011 | Hooton | E05D 3/10 | 16/367 |
| 2016/0297481 A1* | 10/2016 | Yokoi | B62D 25/087 | |
| 2018/0291658 A1* | 10/2018 | Trentin | E05D 3/147 | |
| 2019/0369671 A1* | 12/2019 | Seo | G06F 1/1681 | |
| 2019/0376315 A1* | 12/2019 | Stapf | E05B 47/00 | |
| 2019/0376332 A1* | 12/2019 | Chi-Hsueh | G06F 1/1681 | |
| 2020/0040628 A1* | 2/2020 | Trentin | E05D 3/02 | |

* cited by examiner

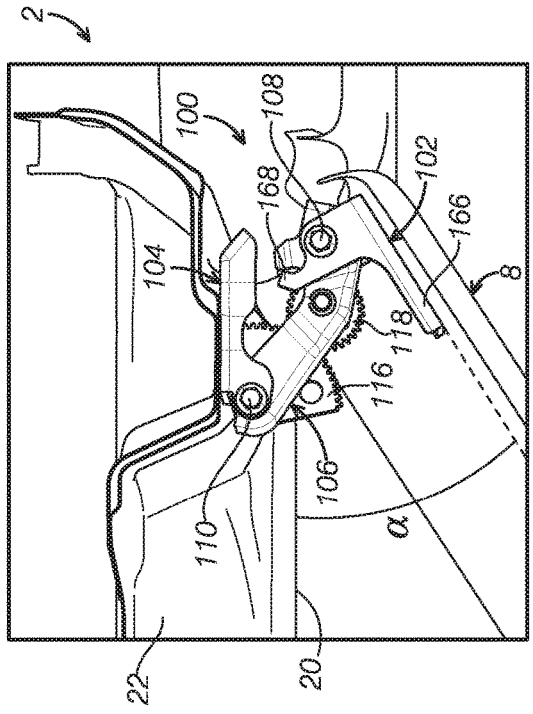
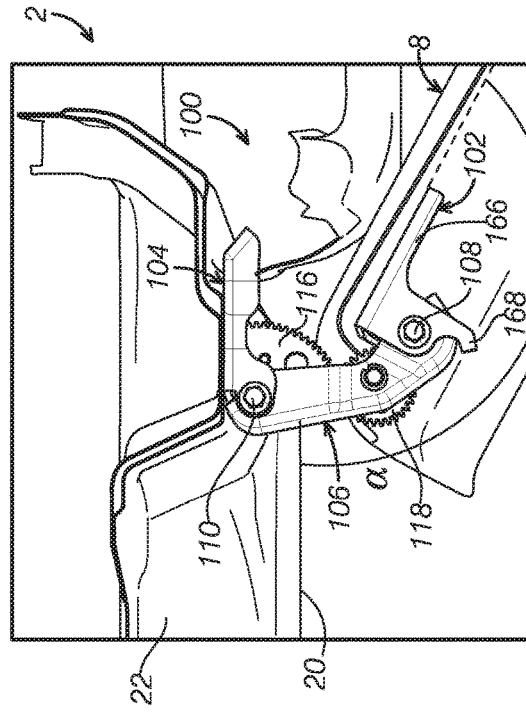
FIG. 11A
FIG. 11B
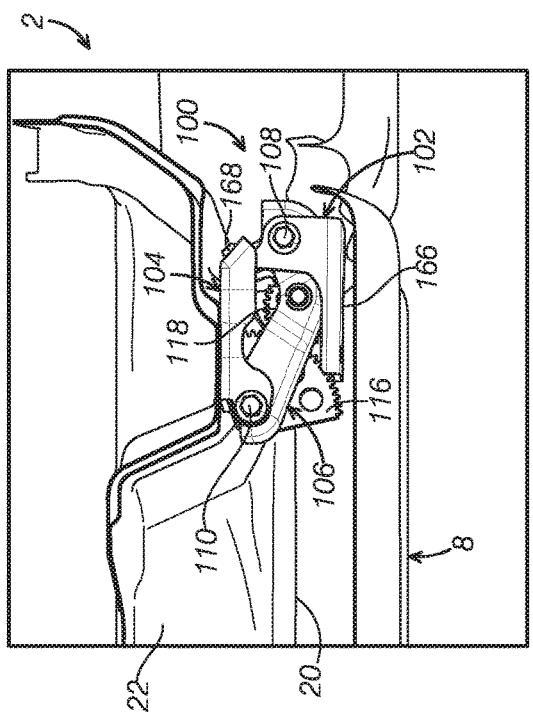
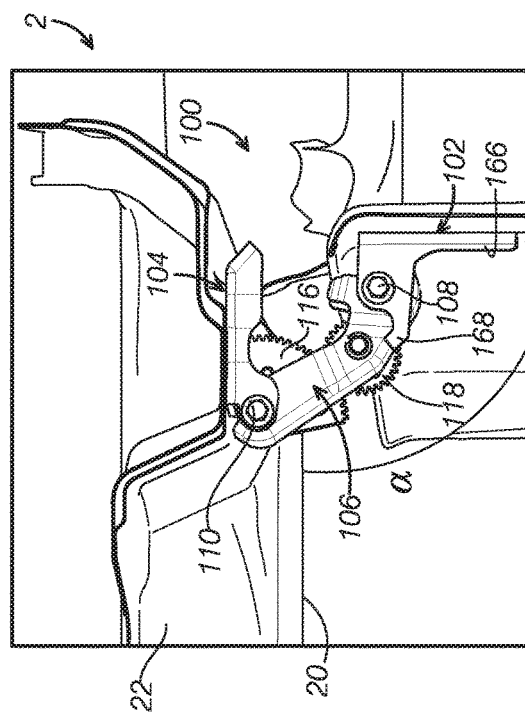
FIG. 11C
FIG. 11D

DUAL PIVOT HINGE ASSEMBLIES

FIELD

The present disclosure relates to dual pivot hinge assemblies, specifically relates to hinge assemblies including two parallel pivots that allows a closure to translate outwards during its opening rotation

BACKGROUND

For some vehicles such as pickup tracks, it is desirable for a vehicle closure (e.g., a rear access panel) to open greater than 90 degrees. The closure needs to translate outboard during opening to clear the adjacent bodyside for opening at greater angles. A hinge to accomplish such opening may be large in volume or complicated in its structure. In some vehicles, adding large holes or grooves in the bodyside of the vehicle to aid in fitment of the hinge can be difficult and infeasible. Thus, there is a need for a compact hinge assembly that allows greater opening of the closure.

SUMMARY

According to one aspect of the present disclosure, a hinge assembly is provided. The hinge assembly comprises a link arm; a first pivot connected to a door leaf and the link arm; a second pivot parallel and distant to the first pivot, and connected to a body leaf and the link arm; a first gear attached to the first pivot; a second gear attached to the second pivot; and an idler gear engaging the first and second gears at a plane substantially perpendicular to the first pivot.

In one embodiment, a cross-section of the link arm at a plane substantially perpendicular to the first pivot may have a boomerang shape, and the link arm have a first side, a second side and a main surface substantially parallel to the first and second pivots and between the first and second sides.

In another embodiment, the first gear, the second gear and the idler gear may be positioned adjacent to the first side or the second side of the link arm.

In another embodiment, the first gear may be a pinion gear having a first radius and fixed to the door leaf, the second gear is a sector gear having a second radius and fixed to the body leaf, and the idler gear is a pinion gear having a third radius, and the second radius may be greater than the third radius and the third radius is greater than the first radius.

In another embodiment, the movement of the idler gear along a circumference of the second gear varies with an opening angle of the door. The door is closed when the idler gear engages the second gear at a retracted position that is close to the body leaf, and the door is fully opened when the idler gear engages the second gear at a deployed position that is away from the body leaf. The first gear, the second gear and the idler gear are sized such that a main surface of the door leaf is at an angle about 90 degree or greater than 90 degrees relative to a main surface of the body leaf when a door is fully opened.

In another embodiment, the door leaf may include a first arm and a second arm. The first and second arm may extend from edges of the main surface of the door leaf and sandwich the link arm and the first gear. The first arm of the door leaf may include a catcher leg and the body leaf may include a catcher receiver, and the catcher leg is received in the catcher receiver at the closed position of the door.

In another embodiment, the link arm may include a first sidewall and a second sidewall extending from the main surface at the first and second side, respectively, and the first and second sidewalls may include a first pair of holes and a second pair of holes to receive the first and second pivots, respectively. The first and second arms of the door leaf may include a pair of installation holes corresponding to the first pair of holes of the arm link for the first pivot to pass through and connect the door leaf with the link arm.

In another embodiment, the body leaf may include a first sidewall and a second sidewall extending from the main surface at first and second edges which are parallel each other. The first and second sidewalk of the body leaf may include a pair of installation holes corresponding to the second pair of holes on the link arm for the second pivot to pass through and connect the body leaf with the link arm.

In another embodiment, the first and second sidewalls of the link arm may further include a first stop and a second stop, respectively. The first and second stops are adjacent to the first and second arms of the door leaf, respectively and extends away from the first pivot. The first and second stops contact the door leaf at a fully opened position to impede further movement of the door leaf.

In another embodiment, the first stop may be further configured to contact the catcher receiver of the body leaf at the closed position to further lock the door leaf to the body leaf.

In another embodiment, the link arm may further include a third pair of holes between the first and second pairs of the holes. The hinger assembly may further comprise a shaft. The shaft includes a first end and a second end, and the second gear may be connected to the second end of the shaft, the shaft passes through the third pair of holes on the second sidewall and first sidewall of the link arm consequentially and the first end of the shaft is connected to the first sidewall of the link arm.

In another embodiment, the hinge assembly may further comprise a check feature installed on the first pivot to provide a hold-on function of the closure at intermediate positions between the closed position and the fully opened position.

In another embodiment, the body leaf may further include a base bracket having a main surface, a mounting plate substantially perpendicular to the main surface of the base bracket and a screw adjuster. The mounting plate may be parallel to a main surface of the second gear and has a hole. The screw adjuster engages with the hole on the second gear to fix the second gear to the body leaf. The position of the second gear relative to the base bracket of the body leaf is adjusted by the screw adjuster during door assembling to achieve predetermined flushness of the door with a body at the closed position through correct timing of the engagement of the catcher leg to catcher receiver.

In another embodiment, the body leaf may further include a base bracket having a main surface, a mounting plate and a screw adjuster. The mounting plate may include a first plate substantially parallel to a main surface of the second gear, and a second plate. The second plate may be substantially perpendicular to the first plate and facing a side surface of the second gear and have a hole. The screw adjuster passes through the hole on the second plate to fix the second gear. A position of the second gear relative to the base bracket of the body leaf is adjusted by the screw adjuster during door assembling to achieve predetermined flushness of the door with a body at the closed position.

In another embodiment, the door leaf may Include a first arm and a second arm. The first and second arms extend from edges of the main surface of the door leaf and sandwich the link arm. The first gear may be integrated formed with the second arm.

According to another aspect of the present disclosure, a hinge assembly for a vehicle door is provided. The hinge assembly comprises a door leaf attached to an edge portion of a door; a body leaf attached to an edge portion of a body; a link arm; a first pivot connected to a door leaf and the link arm; a second pivot parallel, distant to the first pivot and connected to a body leaf and the link arm; a first gear attached to the first pivot; a sector gear attached to the second pivot; and an idler gear engaging the first and second gears at a plane substantially perpendicular to first pivot. The axes of the first and second pivots are vertical, and the plane is above or below the link arm. The idler gear moves along a circumference of the sector gear during a door opening and a door closing cycle and the first gear, the second gear and the sector gear are sized such that a main surface of the door leaf is about 90 degrees or greater than 90 degrees to a main surface of the body leaf at a fully opened position.

In one embodiment, at the closed position the main surface of the door leaf may be opposite the main surface of the body leaf and sandwich the link arm.

In another embodiment, the idler gear may be fixed to the link arm, and a distance between an engagement position of the idler gear and the body leaf at an opened position is greater than a distance between an engagement position of the idler gear and the body leaf at a closed position.

According to yet another aspect of the present disclosure, a hinge assembly for a vehicle door is provided. The hinge assembly comprises a door leaf attached to an edge portion of a door; a body leaf attached to an edge portion of a body; a link arm; a first pivot connected to a door leaf and the link arm; a second pivot parallel, distant to the first pivot and connected to a body leaf and the link arm; and a gear set rotatably connected to the first and second pivot.

In one embodiment, the gear set may comprise a first gear attached to the first pivot, a sector gear attached to the second pivot, and an idler gear engaging the first and second gears at a plane substantially perpendicular to first pivot. A radius of the sector gear is larger than a radius of the idler gear

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 11A-11D are cross-sectional views of a partial vehicle, showing different positions the hinge assembly of the present disclosure during a door opening process. FIG. 11A shows the hinge assembly at a closed position, FIG. 11B shows the hinge assembly at a first open position, FIG. 11B shows the hinge assembly at a second open position and FIG. 11D shows the hinge assembly at a fully open position.

DETAILED DESCRIPTION

The disclosed hinge assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various hinge assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
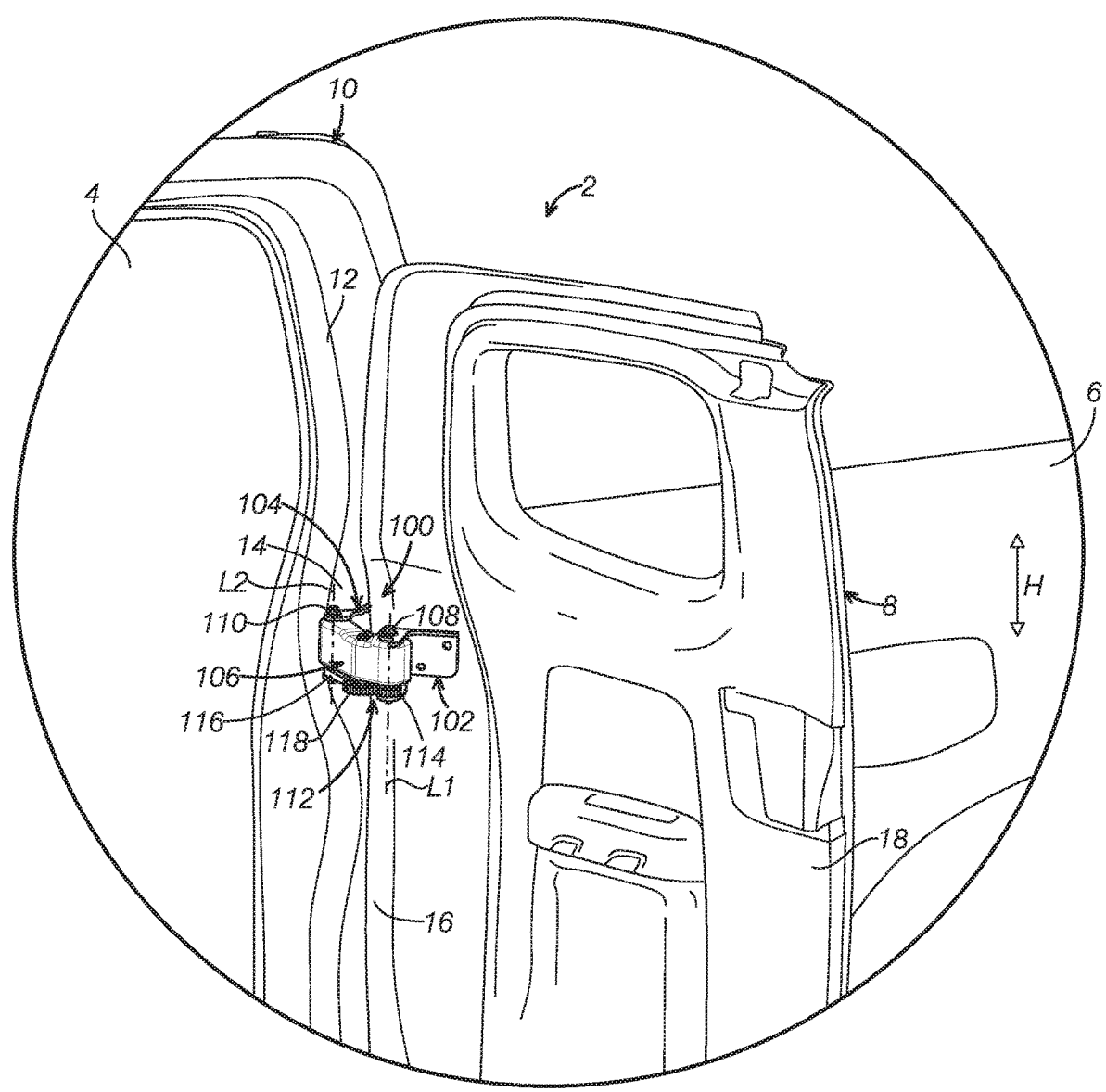
FIG. 1 is a partial perspective view of a vehicle, illustrating an example environment in which a hinge assembly of the present disclosure is used.

FIG. 1 is a partial perspective view of a vehicle 2, illustrating an example environment in which a hinge assembly 100 for a closure of the present disclosure may be used. The depicted example illustrates the hinge assembly 100 used in a pickup truck and a vehicle closure is a rear access panel of the truck. It should be appreciated that the hinge assembly 100 may have other applications. For examples, the hinge assembly of the present disclosure can apply to side doors, hoods, liftgate, decklids or tailgates of a vehicle. In other examples, the hinge assembly of the present disclosure may be used in any applications which require a closure to open a greater angle relative to a body, which include but not limited to the closures in trains, airplanes, ships and buildings. For the sake of simplicity, the closure is generally referred to as a door in this application.

The vehicle 2 may be a pickup truck including a cabin 4, a truck box 6 and a rear access panel 8 or a door 8. The cabin 4 comprises a bodyside 10 including a side door opening frame 12. The side door opening frame 12 is the vehicle structure to which the hinge assembly 100 is attached. The hinge assembly 100 comprises a door leaf 102, a body leaf 104, and a link arm 106 coupling the door leaf 102 and the body leaf 104. The hinge assembly 100 further comprises a first pivot 108 connected to the door leaf 102 and the link arm 106, a second pivot 110 connected to the body leaf 104 and the link arm 106, and a gear set 112. The first pivot 108 is substantially parallel to the second pivot 110 or a longitudinal axis L1 of the first pivot 108 is substantially parallel to a longitudinal axis L2 of the second pivot 110. The link arm 106 and the gear set 112 are configured such that the second pivot 110 or a body pivot allows for door outwards translation while the first pivot 108 or a door pivot allows for door rotation. In the depicted embodiment, the first pivot 108 and the second pivot 110 are vertical or substantially parallel to a height H direction. It should be appreciated that the longitudinal axes L1, L2 of the parallel first and second pivots 108 and 110 may extend at the direction other than the vertical direction. For example, when the hinge assembly is used on a liftgate, the longitudinal axes of the parallel first and second pivots would extend substantially at a horizontal direction. It should be appreciated that "substantially parallel" may refer that an angle between the two pivots or between two longitudinal axes may be about zero.

The body leaf 104 may be positioned on a surface 14 of the side door opening frame 12. The door leaf 102 may be positioned on an inner edge 16 of the door 8. The inner edge 16 is closer to the side door opening frame 12 than an outer edge 18 is. In other words, the first pivot 108 is positioned adjacent to the inner edge 16 of the door 8. The link arm 106 is disposed between the first pivot 108 and the second pivot 110. In the depicted embodiment, the gear set 112 is disposed below the link arm. It should be appreciated that the gear set 112 may be disposed above the link arm 106 or anywhere in between with suitable cut-outs to the link arm 106.

The hinge assembly 100 is compact and can be concealed when the door 8 is closed. Further, the hinge assembly of the present disclosure can have a wide range of the applications in various model of the vehicles since the space required for housing the hinge assembly is small.

Figure 2:
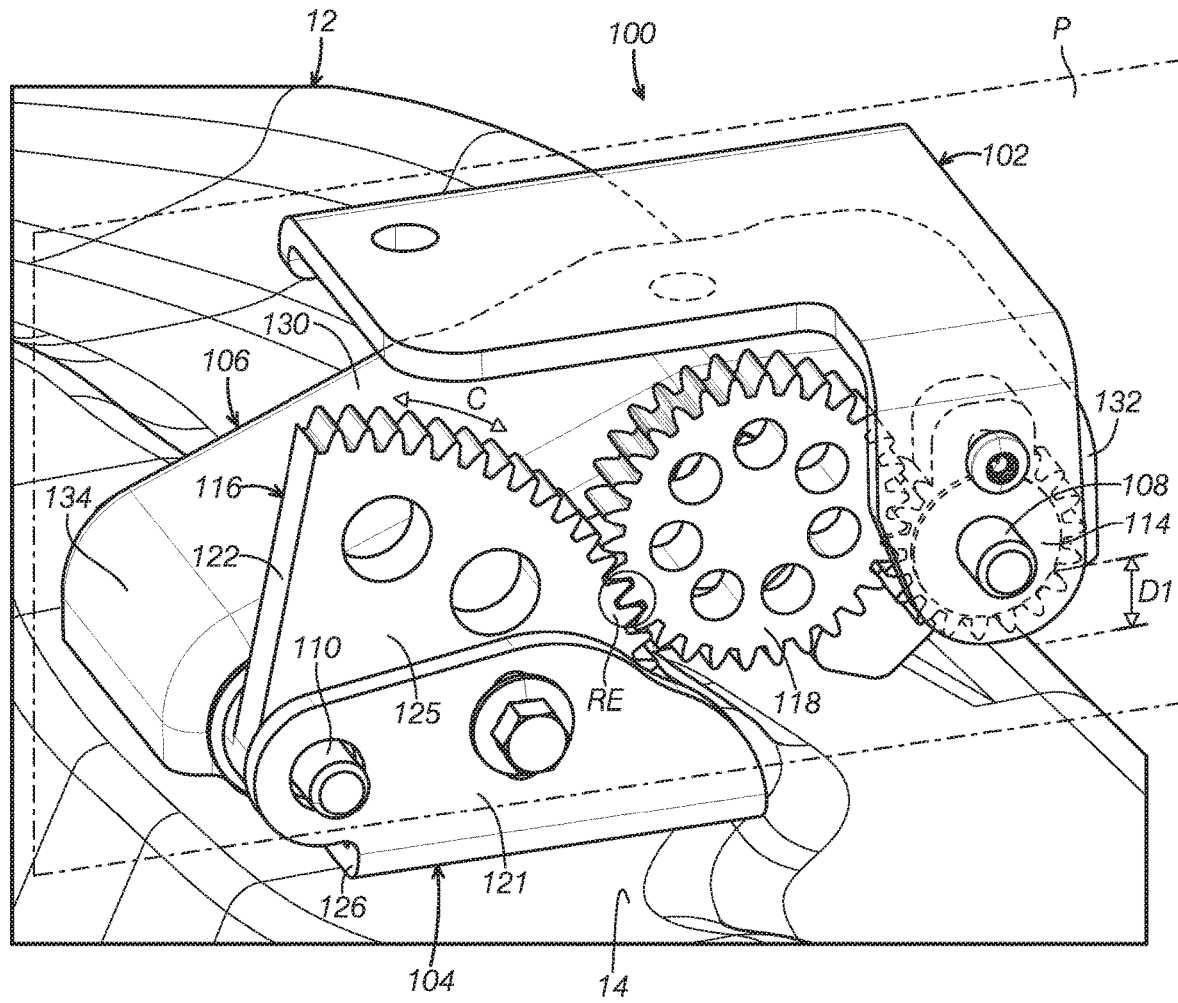
FIG. 2 is a perspective view of a hinge assembly according to one embodiment of the present disclosure, illustrating the hinge assembly at a closed position.
Figure 3:
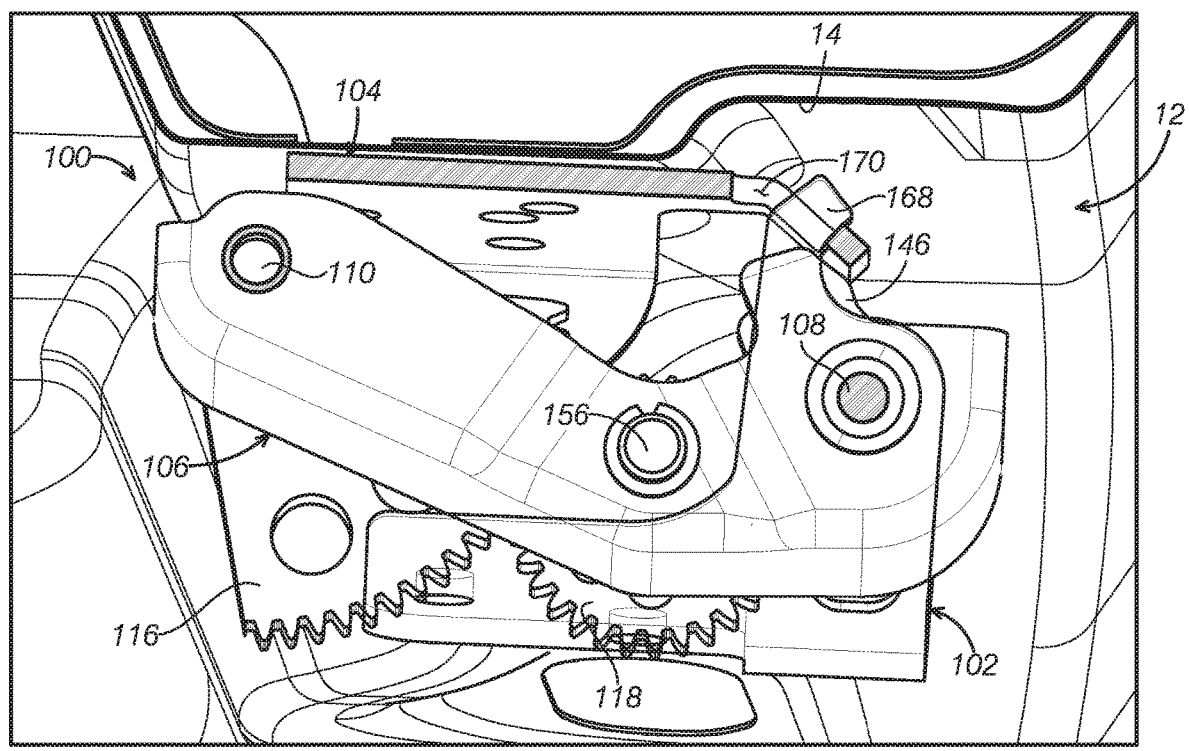
FIG. 3 is another perspective view of the hinge assembly in FIG. 2, illustrating the hinge assembly at a closed position.
Figure 4:
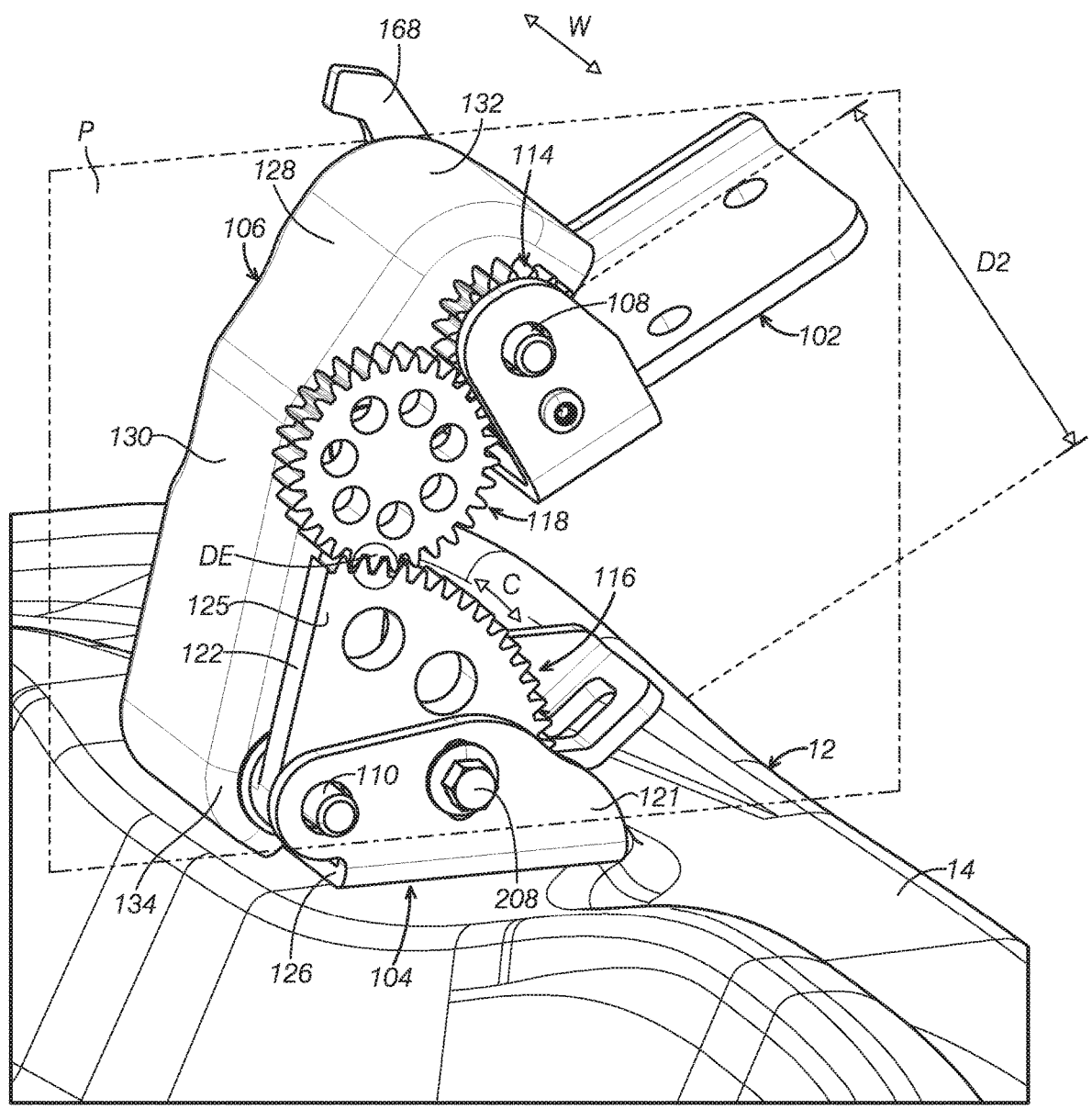
FIG. 4 is a perspective view of the hinge assembly in. 2, illustrating the hinge assembly at a fully open position.
Figure 5:
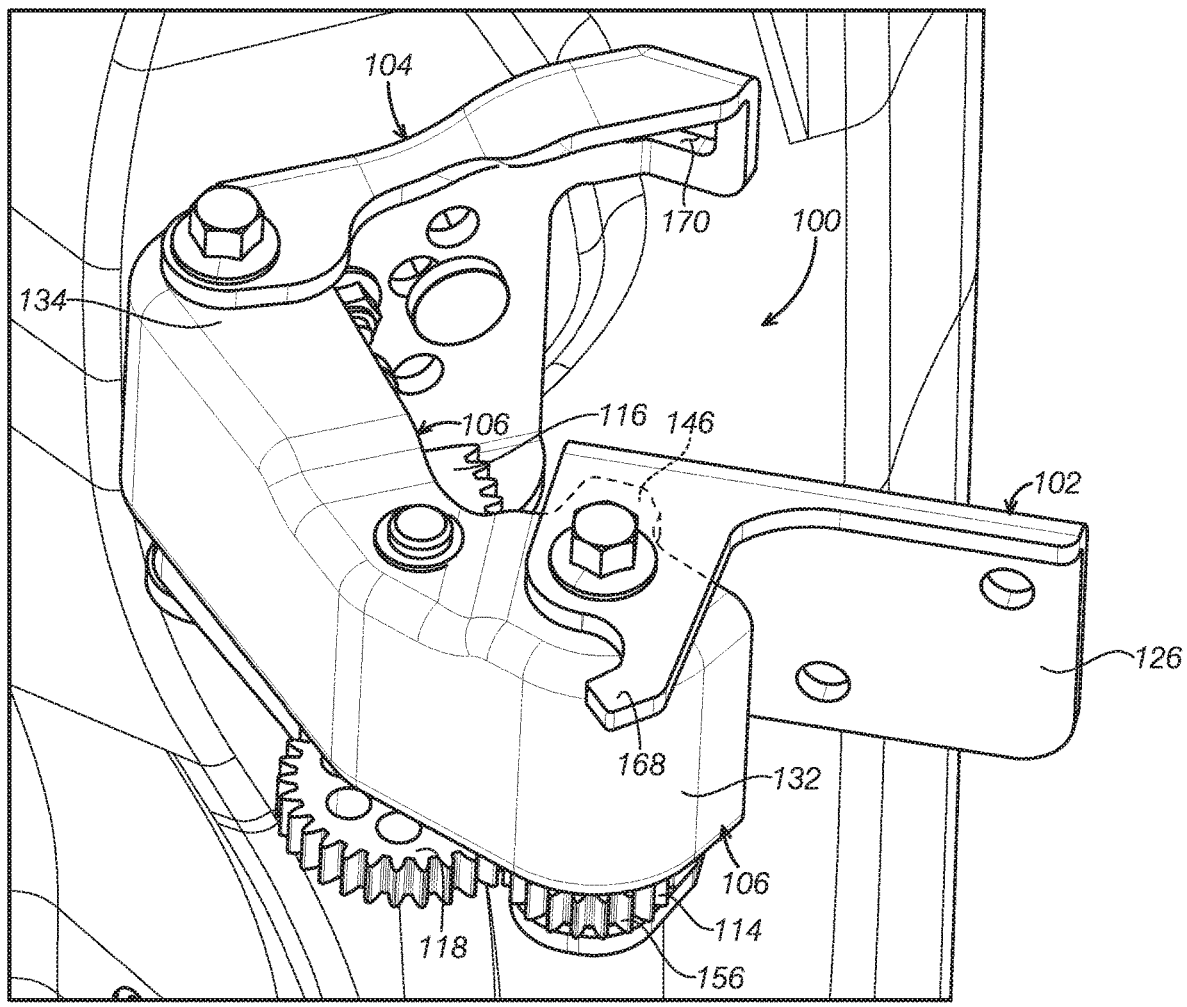
FIG. 5 is another perspective view of the hinge assembly in FIG. 2, illustrating the hinge assembly at a fully open position.
Figure 6:
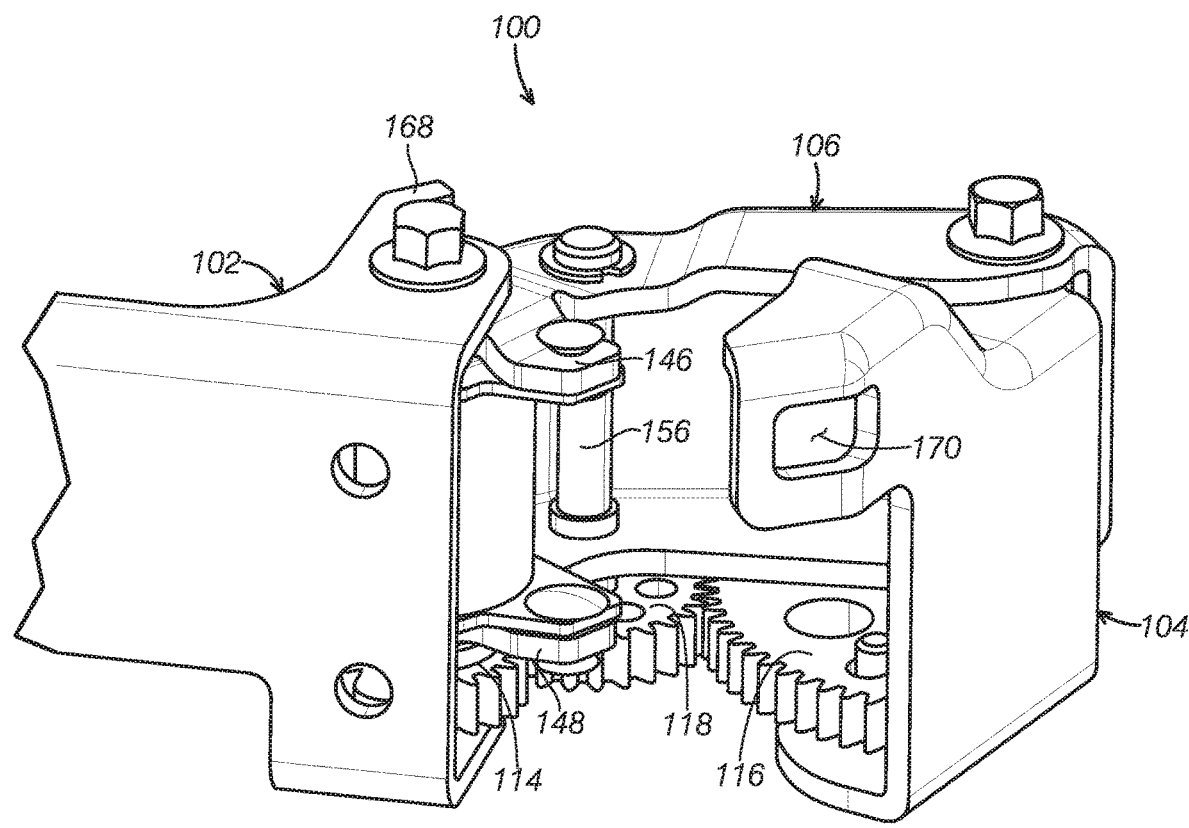
FIG. 6 is a perspective view of the hinge assembly in FIG. 2, illustrating the hinge assembly at a partially open position.
Figure 7:
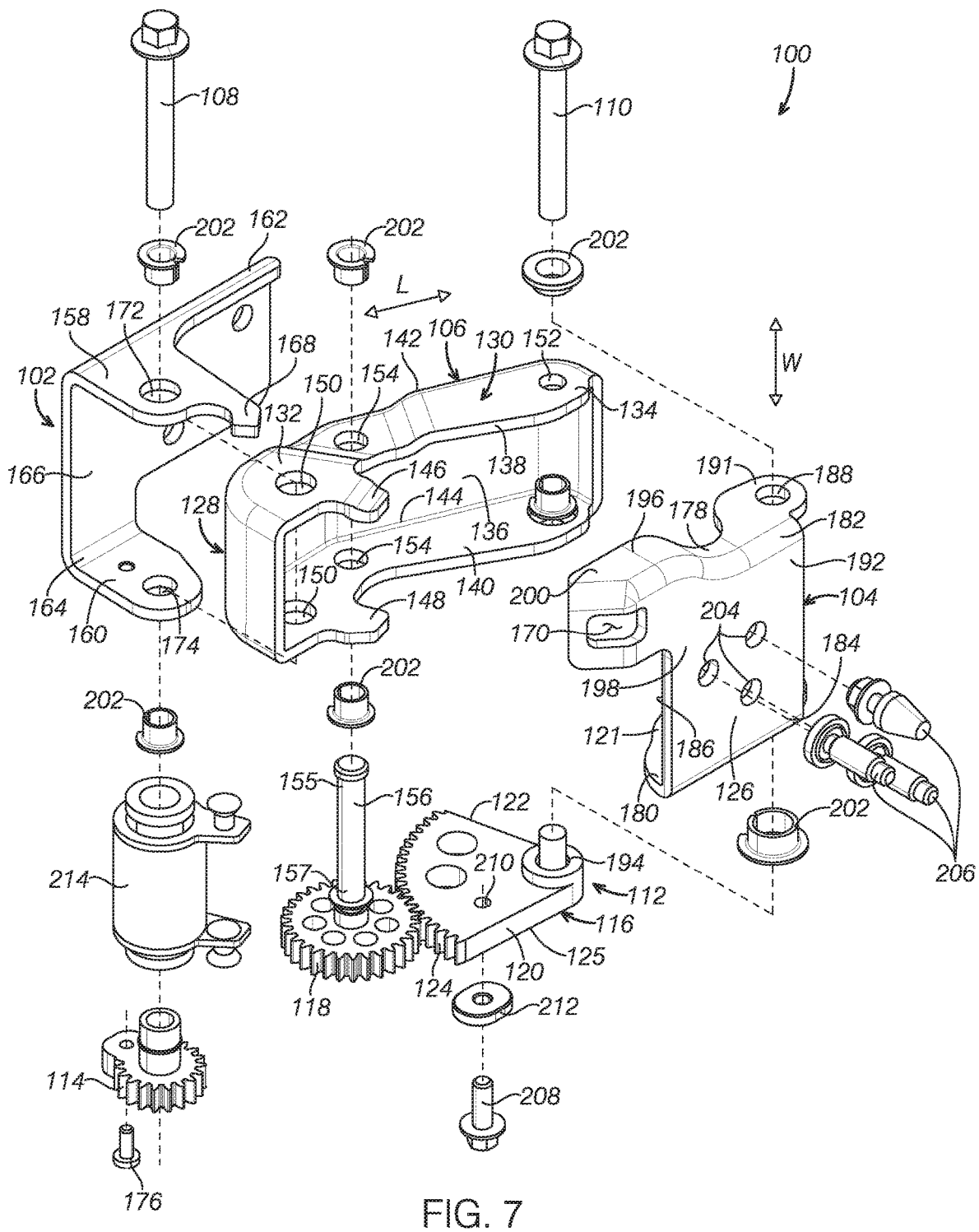
FIG. 7 is an exploded view of the hinge assembly in FIG. 2.
Figure 8:
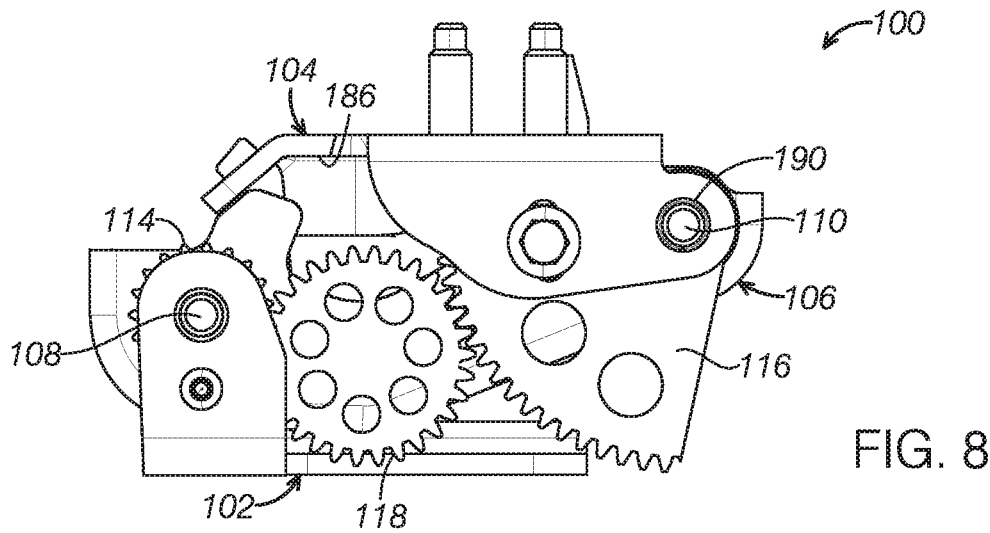
FIG. 8 is a plan view of the hinge assembly in FIG. 2.
Figure 9:
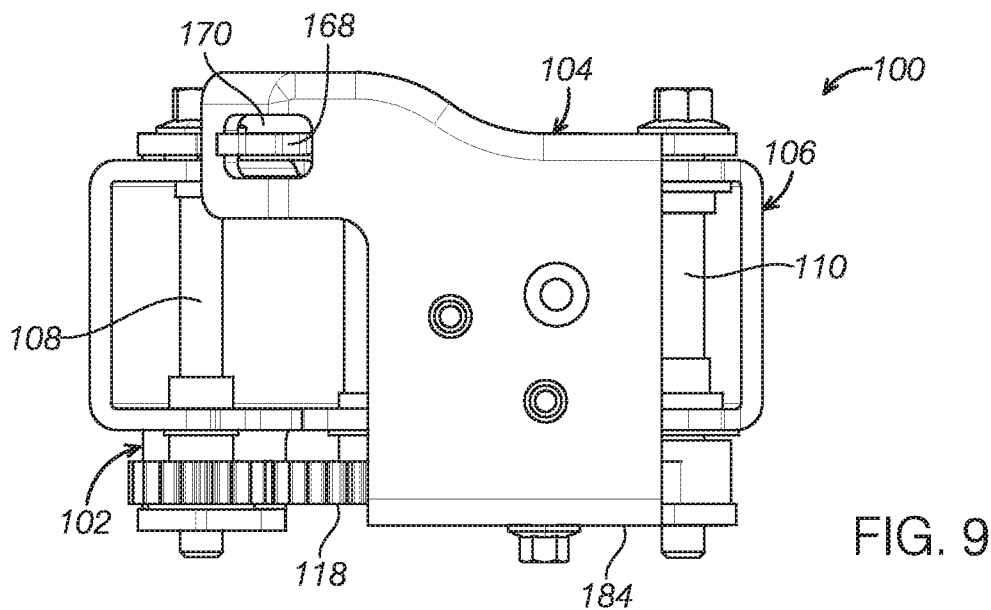
FIG. 9 is a side view of the hinge assembly in FIG. 2.
Figure 10:
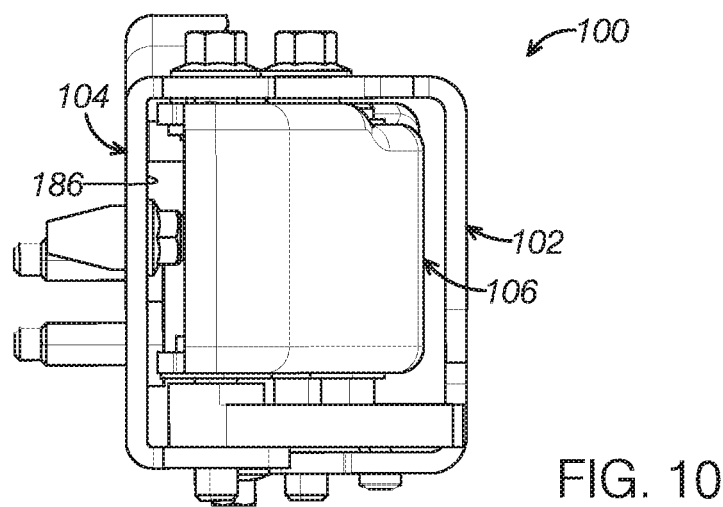
FIG. 10 is another side view of the hinge assembly in FIG. 2.

Referring to FIGS. 2-10, FIGS. 2-3 are perspective views of the hinge assembly 100, illustrating the hinge assembly at a closed position. FIGS. 4-5 are perspective views of the hinge assembly 100, illustrating the hinge assembly at a fully open position from different viewing angles. FIG. 6 illustrates the hinge assembly at a partially open position. FIG. 7 is an exploded view of the hinge assembly 100. FIG. 8 is a bottom plan view of the hinge assembly 100 and FIGS. 8-9 are side views of the hinge assembly 100.

Referring to FIGS. 2 and 4, the hinge assembly 100 comprises the door leaf 102, the first pivot 108 connected to the door leaf 102 and the link arm 106; the second pivot 110 parallel, distant to the first pivot 108 and connected to the body leaf 104 and the link arm 106. The first and second pivots 108, 110 are connected to the gear set 112. The gear set 112 is configured to rotate the link arm 106 about the second pivot 110 when the door 8 is opened and closed. Rotation of the link arm 106 about the second pivot 110 results in the corresponding rotation of the first pivot 108, which also has an outboard translation of the door leaf 102 relative to the side door opening frame 12. In the depicted embodiment, the gear set 112 includes a first gear 114 attached to the first pivot 108 and fixed to the door leaf 102, a second gear 116 attached to the second pivot 110 and fixed to the body leaf 104, and an idler gear 118 engaging the first and second gears 114, 116. The first gear 116, the second gear 116 and the idler gear 118 are engaged at one plane P which is substantially perpendicular to first pivot 108 and/or second pivot 110 or substantially perpendicular the longitudinal axes L1, L2.

Continuing with FIGS. 2 and 4 and with further reference to FIG. 7, in some embodiments, the first gear 114 and the idler gear 118 may be pinion gears and the second gear 116 may be a sector gear. The sector gear 116 may have a first side surface 120 facing a base bracket 126 of the body leaf 104, a second side surface 122 facing away or opposite the idler gear 118 and a toothed surface 124, which collectively form a side surface of the sector gear 116. The sector gear 116 has a main surface 125 substantially perpendicular to the side surfaces 120, 122.

The first gear 114 has a first radius, the second gear 6 has a second radius and the idler gear has a third radius. The second radius of the sector gear 116 is greater than the third radius of the idler gear 118. In some embodiments, the third radius of the idler gear 118 is greater than the first radius of the first gear 114.

In some embodiments, the body leaf 104 may include a base bracket 126 attached to the side door opening frame 12 and a mounting plate 121 for connecting the sector gear 116, the link arm 106 and the second pivot 110.

Referring to FIG. 7 and with further reference to FIG. 2, in some embodiments, the link arm 106 may have a first portion 128 and a second portion 130 having an angle with the first portion 128. The first and second portions 128, 130 may be integrally formed. As shown in FIGS. 2 and 4, the link arm 106 has a boomerang shape when viewed from a bottom. The boomerang shape allows for clearance to the door inner edge 16 when the door 8 is in the fully open condition. The first portion 128 of the link arm 106 has a free end 132 connected with the first pivot 108 and the second portion 130 has a fixed end 134 connected with the second pivot 110. A lengthwise direction L of the link arm 106 is substantially perpendicular to the first pivot 108 and/or the second pivot 110. A widthwise direction W of the link arm 106 is substantially parallel to the first pivot 108 and/or second pivot 110. The length of the second portion 130 may be longer than the length of the first portion 128. The link arm 106 has a main surface 136 parallel to the first pivot 108 and/or the second pivot 110, a first sidewall 138 and a second sidewall 140 which extend from the main surface 136 at edge portions 142, 144, respectively.

Continuing FIG. 7 and with further reference to FIG. 5, in some embodiments, the first sidewall 138 on the first portion 128 may include a first stop 146 protruding further away from the main surface 136. As shown in FIG. 5, the first stop 146 touches the door leaf 102 to impede further movement of the door leaf 102 at the fully opened position. In the depicted embodiment, the second sidewall 140 may further include a second stop 148 at a position corresponding the first stop 146. At the fully opened position, both the first and second stops 146, 148 contact the door leaf 102 to prevent further motion of the door leaf 102.

Continuing FIG. 7 and with further reference to FIGS. 5-6, in some embodiments, the first and second sidewalls 138, 140 may include a first pair of holes 150 and a second pair of holes 152 to receive the first and second pivots 108, 110, respectively. In some embodiments, the first and second sidewalk 138, 140 may include a third pair of holes 154 between the first pair of holes 150 and the second pair of holes 152. As shown in FIGS. 5-6, the third pair of holes 154 allow a shaft 156 to pass through to connect the idler gear 118 to the link arm 106. The shaft 156 may include a first end 155 and a second end 157. The idler gear 118 may be connected to the second end 157 of the shaft 156. The shaft 156 passes through the third pair of holes 154 on the second sidewall 140 and the first sidewall 138 of the link arm 106 consequentially and the first end 155 of the shaft 156 may be connected to the first sidewall 138 of the link arm 106. It should be appreciated that the idler gear 118 may be only attached to the second sidewall 140.

Referring to FIGS. 2-6, the gear set 112 may be disposed adjacent to and outside the first side 138 or the second side 140. In the depicted embodiment, the gear set 112 is disposed adjacent to the second side 140 of the link arm 106 or below the link arm 106.

Referring to FIGS. 2 and 4, when the door 8 is pulled by a user, the gear set 112 is driven. The rotation of the door 8 rotates the first gear 114, which in turn drives the idler gear 118. The idler gear 118 subsequently moves along a circumference C of the sector gear 116 and the engagement position of the idler gear 118 at the sector gear 116 is changed. For example, the idler gear 118 can climb on the sector gear 116 from a closed position shown in FIG. 2 to an open position shown in FIG. 4. As a result, a distance D of the free end 132 of the link arm 106 to the side frame 12 is changed from D1 to D2. That is, the door leaf 102 is translated. As shown in FIG. 2, when the door is closed, the idler gear 118 engages the second gear 116 at a retracted position RE. The retracted position RE is close to the base bracket 126 of the body leaf 104 or the surface 14 of the side door opening frame 12 or D1 is minimum at the closed position. As shown in FIG. 4, when the door is fully opened, the idler gear 118 engages the second gear 116 at a deployed position IDE. The deployed position DE is located further distant away from the base bracket 126 of the body leaf 104 or the distance D2 between the free end 132 and the surface 14 of the side door opening frame 12 is maximum. In the depicted embodiment, the deployed position DE is adjacent to the second side surface 122 of the sector gear 116. When the door is half opened, the engagement position of the idler gear 118 is at a position between the retracted position RE and the deployed position DE or the distance D is between D1 and D2.

Turning back to FIG. 7 and with further reference to FIGS. 3-6, the door leaf 102 may include a first arm 158 and a second arm 160. The first arm 158 and the second arm 160 extend from a first edge 162 and a second edge 164 of a main surface 166 of the door leaf 102, respectively and sandwich the link arm 106 and the first gear 114. In some embodiments, the first arm 158 of the door leaf 102 may include a catcher leg 168. In the depicted embodiment, the catch leg 168 has a hooked shape configured to interact with a catcher receiver 170 on the body leaf 104 to lock the door leaf 102 at the closed position.

Further, the first arm 158 and the second arm 160 of the door leaf 102 may include a first installation hole 172 and a second installation hole 174, respectively to allow the first pivot 108 to pass through. The first pivot 108 may pass through the first installation hole 172, the first pair of holes 150 and the second installation hole 174 consecutively to be connected with the door leaf 102, the link arm 106 and the first gear 114. A fastener 176 may be used to couple the first gear 114 with the second arm 160 of the door leaf 102.

Referring FIG. 7-10, the body leaf 104 may include a first sidewall 178 and a second sidewall 180 extending from a first edge 182 and a second edge 184 of a main surface 186, respectively and parallel each other. The second sidewall 180 may form the mounting plate 121. The first and second sidewalls 182, 184 include a first installation hole 188 and a second installation hole 190, respectively and adjacent a first end 191 of the body leaf 104. The first installation hole 188 and the second installation hole 190 correspond to the second pair of holes 152 on the link arm 106. The second pivot 110 passes through the first installation hole 188, the second pair of holes 152 on the link arm 106, the second installation hole 190 and a hole 194 on the second gear 116 and is connected with the body leaf 104, the link arm 106 and the second gear 116.

Referring to FIG. 7 and with further reference to FIGS. 3-6, the body leaf 104 may further include an upper portion 196 at a second end 198. In the depicted embodiment, the upper surface 200 of the upper portion may be disposed above the first side wall 178. The upper portion 196 may include a catcher receiver 170. In the depicted embodiment, the catch receiver 170 is an aperture configured to receive the catcher leg 168 at the closed position. It should be appreciated that the catch receiver 170 may have other configurations such as a recess with one side towards the path of the catcher leg 168 opened to receive the catch leg 168. As shown in FIGS. 3 and 8, the catch leg 168 is received in the catch receiver 170 to lock the door leaf 102 to the body leaf 104 at the closed position.

Referring to FIG. 3, the first stop 146 is partially received in the catch receiver 170 at the closed position. Thus, the first stop 146 can further secure the link arm 106 and the door leaf 102 at the lock position. That is, the first stop 146 has dual function.

Turning to FIG. 7, the hinge assembly 100 may further comprise multiple bushes 202 corresponding to the first pair of holes 150, the second pair of holes 153 and the third pair of holes 154 for securing the link arm 106 to the door leaf 102, the body leaf 104, the first pivot 108, the second pivot 110, the shaft 156, and the idler gear 118.

The body leaf 104 may further include multiple mounting holes 204 and corresponding fasteners 206. The body leaf 104 are fixed to the side door opening frame 12 of the vehicle body via the fasteners 206.

Referring to FIGS. 4 and 7, the hinge assembly 100 may further include a screw adjuster 208 to adjust a position of the second gear 116. For example, the body leaf 104 may include the mounting plate 121 substantially parallel to the main surface 125 of the sector gear 116. The screw adjuster 208 passes through a hole 210 on the sector gear 116 to fix the sector gear 116 on the body leaf 104. A position of the sector gear relative to the base bracket 126 can be adjusted via the screw adjuster 208 during installation of the door 8 and the hinge assembly 100 such that the closed position of the door can be adjusted to achieve flushness when the door is closed. A washer 212 may be used with the screw adjuster 208 for better connection and adjustment.

Referring to FIG. 7, the hinge assembly may further include a check device 214 to provide a hold-on function of the closure at intermediate positions between the closed position and the fully opened position. In the depicted embodiment, the check device 214 may be connected to the door leaf 102 through crimping around the hole 172 and the swing arm at surfaces 130 and 140 of the free end 132 of the link arm 106 and positioned between the surfaces 130 and 140 of the free end of the link a 106. The check device 214 can act to limit the travel of the door leaf 102. Further, the check device 214 may be configured to provide intermediate stops in the travel of the door leaf 102 to allow an attached door to be rested in a partially open position where further opening of the door is either not feasible or simply undesirable for a particular time of use. Such check devices are well known in the relevant art.

FIG. 11A-11D are cross-sectional views of a partial vehicle 2 and show different positions of the hinge assembly 100 of the present disclosure during a door opening process. FIG. 11A shows the hinge assembly 100 at a closed position. At the closed position, the main surface 166 of the door leaf 102 may be substantially parallel to an outer surface 20 of the vehicle body 22. The idler gear 118 is at the retracted position RE which is close to the body leaf 104. The catcher leg 168 on the door leaf 102 is locked into the catch receiver on the body leaf 104.

FIG. 11B shows the hinge assembly 100 at a first open position or a quarter open position. At this position, the idler gear 118 climb the toothed surface of the sector gear 116 toward the end of the sector gear 116 away from the body leaf 104. The catcher leg 168 is released from the body leaf 104. The angle α between the outer surface 20 of the vehicle body and the main surface 166 of the door leaf 102 is an acute angle.

FIG. 11C shows the hinge assembly 100 at a half open position or another half open position. At this position, the idler gear 118 climbs the sector gear 116 and is further away from the body leaf 104. The first pivot 108 in turn is further away from the body leaf 104. Further, the door 8 has been translated outboard from the vehicle body 22. The door 8 has been opened about 90 degrees from the outer surface of the vehicle body 20 such that the angle α is about 90 degrees.

FIG. 11D shows the hinge assembly 100 at a fully open position. From the position shown in FIG. 11C, the door 8 may further translate and rotate around the first pivot 108 such that the door 8 is opened at greater degrees. When the stops 146 and/or 148 on the link arm 106 touch the door leaf 102, further movement of the door leaf 102 or the door 8 is impeded. That is, the door 8 reaches its fully open position. At this position, the door 8 is at an angle α greater than 90 degrees. Depending on the configuration of the hinge assembly (e.g., sizes of the link arm and the gears), the door 8 can be opened at the angle α of up to 135 degrees or greater.

As shown in FIG. 11A, the link arm 106 is substantially positioned between the door leaf 102 and the body leaf 104, and the hinge assembly 100 can be concealed in a space between a door frame and an edge portion of the door. In other words, the hinge assembly is compact and can be installed in a vehicle having limited space for the hinge assembly. Further, the hinge assembly of the present disclosure is simple in structure with two pivots and a simple gear set to achieve a desirable opening of the door with an angle of more than 90 degrees.

Figure 12:
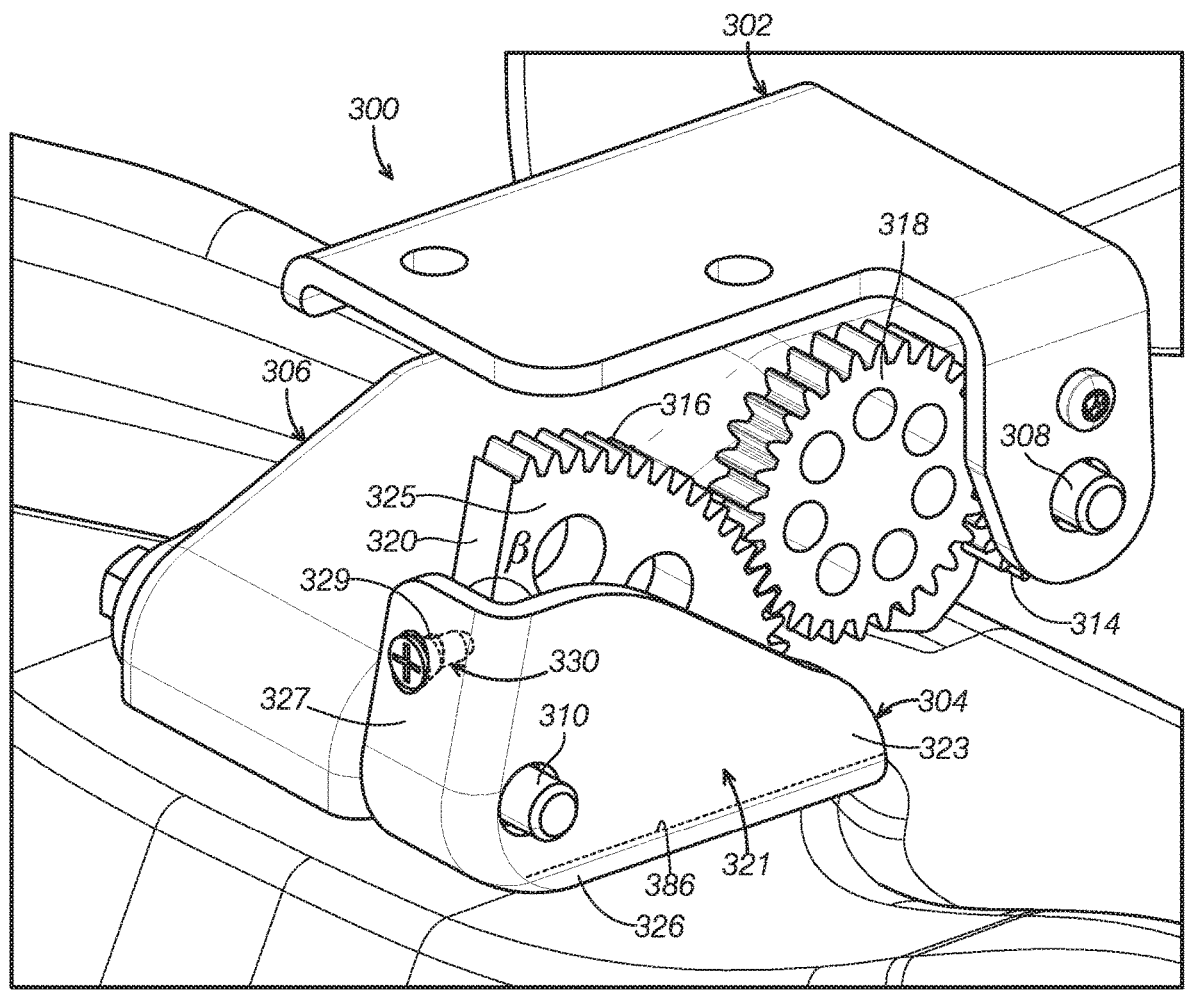
FIG. 12 is a perspective view of a hinge assembly according to another embodiment

FIG. 12 is a perspective view of a hinge assembly 300 according to another embodiment. For the sake of brevity, in this example, the elements and features similar to those previously shown and described will not be described in much further detail. In other words, differences between the present embodiment and the embodiment of FIGS. 2-10 will be mainly described. The hinge assembly 300 may comprise a link arm 306; a first pivot 308 connected to a door leaf 302 and the link atm 306; a second pivot 310 parallel, distant to the first pivot 308 and connected to a body leaf 304 and the link arm 306; a first gear 314 attached to the first pivot 308, a second gear 316 attached to the second pivot 310, and an idler gear 318 engaging the first and second gears 314, 316 at a plane substantially perpendicular to first pivot 308. The difference of the hinge assembly 300 from the hinge assembly 100 is configuration of the body leaf 304 and a screw adjuster 330. The body leaf 304 may include a base bracket 326, a mounting plate 321 and a screw adjuster 330. The mounting plate 321 includes a first plate 323 substantially parallel to a main surface 325 of the sector gear 316 and substantially perpendicular to a main surface 386 of the body leaf 304 and a second plate 327 having an angle β to the first plate 323 and facing a side surface 320 of the sector gear 316. The angle β may be about 90 degrees. The second plate 327 may include a hole 329. The screw adjuster 330 can pass through the hole 329 to contact or connect the side surface 320 of the sector gear 316 at an assembled position. In this way, the position of the sector gear 316 relative to the base bracket 326 of the body leaf 304 is adjusted during installation of the door and the hinge assembly 300 to achieve flushness when the door is closed through correct timing of the engagement of the catcher leg to catcher receiver.

Figure 13:
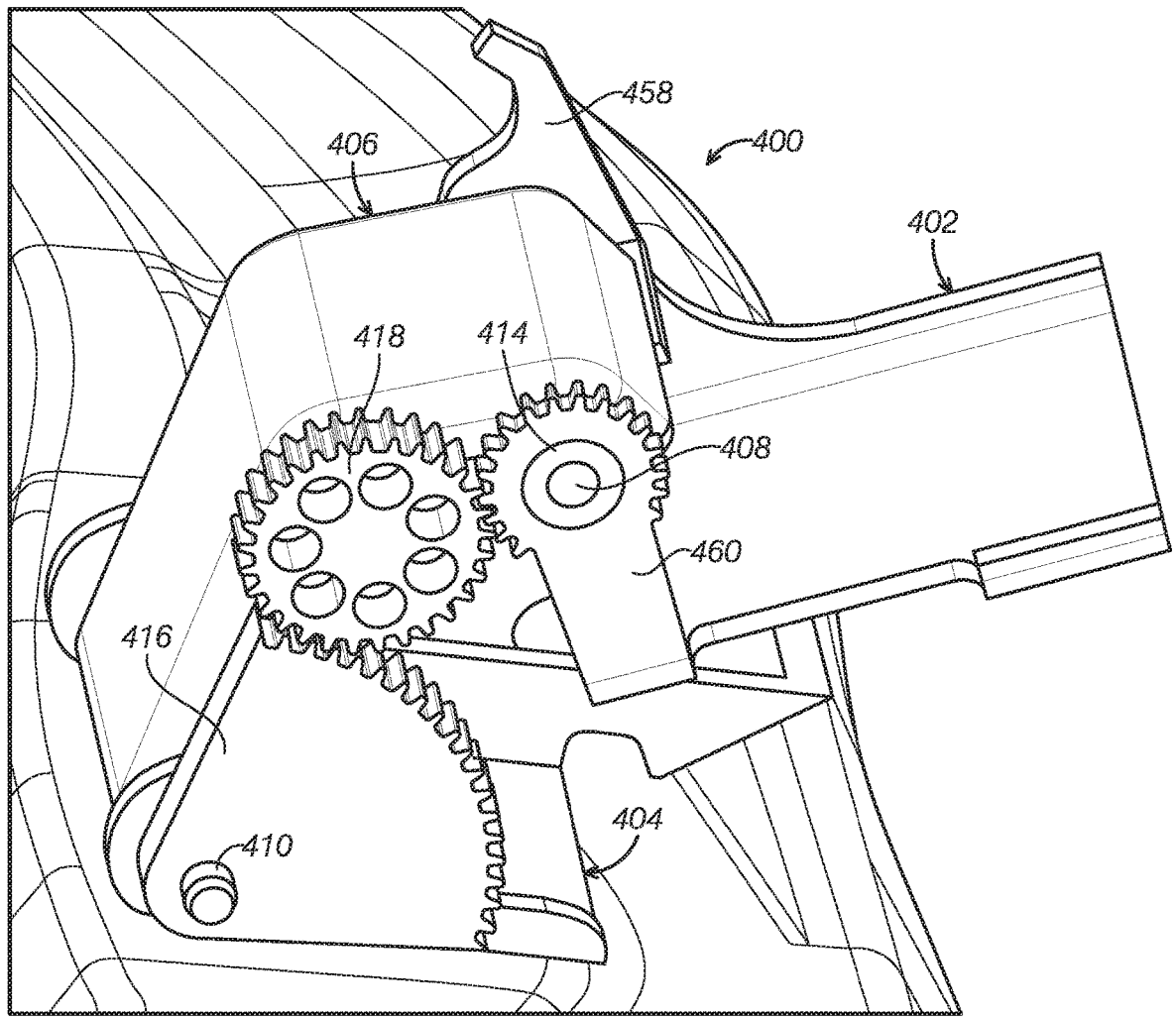
FIG. 13 is a perspective view of a hinge assembly according to yet another embodiment It should be noted that these figures are intended to illustrate the general characteristics of methods, structure and/or materials utilized in certain example embodiments and to supplement the written description provided below. These drawings are not, however, to scale acrd may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

FIG. 13 is a perspective view of a hinge assembly 400 according to yet another embodiment. For the sake of brevity, in this example; the elements and features similar to those previously shown and described will not be described in much further detail. In other words, differences between the present embodiment and the embodiment of FIGS. 1-11 will be mainly, described. The hinge assembly 400 may comprise a link arm 406; a first pivot 408 connected to a door leaf 402 and the link arm 406; a second pivot 410 parallel, distant to the first pivot 408 and connected to a body leaf 404 and the link arm 406; a first gear 414 attached to the first pivot 408, a second gear 416 attached to the second pivot 410, and an idler gear 418 engaging the first and second gears 414, 416 at a plane substantially perpendicular to first pivot 408. The door leaf 402 includes a first arm 458 and a second arm 460. The difference of the hinge assembly 400 from the hinge assembly 100 is the door leaf 402 and the first gear 414. In the depicted embodiment, the first gear 414 is integrated with the second arm 460 or integrally formed as a part of the second arm 460.

The hinge assemblies of the present disclosure allow a closure (e.g., a door) to translate outboard during opening such that the closure can be opened at a degree greater than 90 degrees. The hinge assemblies are simple in structure. Further, the hinge assemblies are compact and can be concealed in a space between the closure and a body frame at the closed position.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. A hinge assembly; comprising:
   a link arm;
   a first pivot connected to a door leaf and the link arm;
   a second pivot parallel, distant to the first pivot, and connected to a body leaf and the link arm;
   a first gear attached to the first pivot;
   a second gear attached to the second pivot; and
   an idler gear engaging the first and second gears at a plane substantially perpendicular to the first pivot.

2. The hinge assembly of claim 1, wherein a cross-section of the link arm at a plane substantially perpendicular to the first pivot has a boomerang shape, and the link arm has a main surface substantially parallel to the first and second pivots, a first side and a second side.

3. The hinge assembly of claim 2, wherein the first gear, the second gear and the idler gear are positioned adjacent to the first side or the second side of the link arm.

4. The hinge assembly of claim 2, wherein the first gear is a pinion gear having a first radius and fixed to the door leaf, the second gear is a sector gear having a second radius and fixed to the body leaf, and the idler gear is a pinion gear having a third radius, and wherein the second radius is greater than the third radius and the third radius is greater than the first radius.

5. The hinge assembly of claim 4, wherein movement of the idler gear along a circumference of the second gear varies with an opening angle of a door,
   wherein the door is closed when the idler gear engages the second gear at a retracted position that is close to the body leaf, and the door is fully opened when the idler gear engages the second gear at a deployed position that is away from the body leaf, and
   wherein the first gear, the second gear and the idler gear are sized such that a main surface of the door leaf is at an angle about 90 degree or greater than 90 degrees relative to a main surface of the body leaf when the door is fully opened.

6. The hinge assembly of claim 5, wherein the door leaf includes a first arm and a second arm, the first and second arm extend from a first edge and a second edge of the main surface of the door leaf and sandwich the link arm and the first gear, and wherein the first arm of the door leaf includes a catcher leg and the body leaf includes a catcher receiver, and the catcher leg is received in the catcher receiver at a closed position of the door.

7. The hinge assembly of claim 6, wherein the link arm includes a first sidewall and a second sidewall extending from the main surface at the first and second side, respectively, and the first and second sidewalls include a first pair of holes and a second pair of holes to receive the first and second pivots, respectively, and
   wherein the first and second arms of the door leaf include a pair of installation holes corresponding to the first pair of holes of the link arm for the first pivot to pass through and connect the door leaf with the link arm.

8. The hinge assembly of claim 7, wherein the body leaf includes a first sidewall and a second sidewall extending from the main surface at a first edge and a second edge and the first and second sidewalls are parallel each other, and include a pair of installation holes corresponding to the second pair of holes on the link arm for the second pivot to pass through and connecting the body leaf with the link arm.

9. The hinge assembly of claim 8, wherein the first and second sidewalls of the link arm further include a first stop and a second stop, respectively, the first and second stops are adjacent to the first and second arms of the door leaf respectively and extends away from the first pivot, and the first and second stops contact the door leaf at a fully opened position to impede further movement of the door leaf.

10. The hinge assembly of claim 9, wherein the first stop is further configured to contact the catcher receiver of the body leaf at the closed position to further lock the door leaf to the body leaf.

11. The hinge assembly of claim 10, wherein the link arm further includes a third pair of holes between the first and second pairs of holes, the hinge assembly further comprises a shaft, the shaft includes a first end and a second end, and the idler gear is connected to the second end of the shaft, and wherein the shaft passes through the third pair of holes on the second sidewall and first sidewall of the link arm consequentially and the first end of the shaft is connected to the first sidewall of the link arm.

12. The hinge assembly of claim 11, further comprising a check device installed on the first pivot to provide a hold-on function of a closure at intermediate positions between the closed position and the fully opened position.

13. The hinge assembly of claim 1, wherein the body leaf further includes a base bracket having a main surface, a mounting plate substantially perpendicular to the main surface of the base bracket and a screw adjuster, wherein the mounting plate is parallel to a main surface of the second gear and has a hole, wherein the screw adjuster engages with the hole on the second gear to fix the second gear to the body leaf, and wherein a position of the second gear relative to the base bracket of the body leaf is adjusted by the screw adjuster during door assembling to achieve predetermined flushness of a door with a body at a closed position.

14. The hinge assembly of claim 1, wherein the body leaf further includes a base bracket having a main surface, a mounting plate and a screw adjuster, wherein the mounting plate includes a first plate substantially parallel to a main surface of the second gear, a second plate substantially perpendicular to the first plate and facing a side surface of the second gear, and having a hole, wherein the screw adjuster pass through the hole on the second plate to fix the second gear, and wherein a position of the second gear relative to the base bracket of the body leaf is adjusted by the screw adjuster during door assembling to achieve predetermined flushness of a door with a body at a closed position.

15. The hinge assembly of claim 5, wherein the door leaf includes a first arm and a second arm, wherein the first and second arms extend from edges of the main surface of the door leaf and sandwich the link arm, and wherein the first gear is integrated formed with the second arm.

16. A hinge assembly for a door of a vehicle, comprising:
   a door leaf attached to an edge portion of the door;
   a body leaf attached to an edge portion of a body;
   a link arm;
   a first pivot connected to the door leaf and the link arm;
   a second pivot parallel, distant to the first pivot and connected to the body leaf and the link arm;
   a first gear attached to the first pivot;
   a sector gear attached to the second pivot;
   and an idler gear engaging the first and second gears at a plane substantially perpendicular to first pivot,
   wherein axes of the first and second pivots are vertical, and the plane is above or below the link arm, and
   wherein the idler gear moves along a circumference of the sector gear during a door opening process and a door closing process and the first gear, the second gear and the sector gear are sized such that a main surface of the door leaf is about 90 degrees or greater than 90 degrees to a main surface of the body leaf at a fully opened position.

17. The hinge assembly of claim 16, wherein at a closed position the main surface of the door leaf is opposite the main surface of the body leaf and sandwich the link arm.

18. The hinge assembly of claim 16, wherein the idler gear is fixed to the link arm, and wherein a distance between an engagement position of the idler gear and the body leaf at an opened position is greater than a distance between an engagement position of the idler gear and the body leaf at a closed position.

19. A hinge assembly for a door of a vehicle, comprising:
 a door leaf attached to an edge portion of the door;
 a body leaf attached to an edge portion of a vehicle body;
 a link arm;
 a first pivot connected to the door leaf and the link arm;
 a second pivot parallel, distant to the first pivot and connected to the body leaf and the link arm; and
 a gear set rotatably connected to the first and second pivots,
 wherein a rotation of the second pivot by the gear set enables translation of the door outboard from the vehicle body and a rotation of the first pivot by the gear set enables a change of an opening angle of the door relative to the vehicle body.

20. The hinge assembly of claim 19, wherein the gear set comprises
 a first gear attached to the first pivot,
 a sector gear attached to the second pivot, and
 an idler gear engaging the first and second gears at a plane substantially perpendicular to first pivot,
 wherein a radius of the sector gear is larger than a radius of the idler gear.

\* \* \* \* \*